(12) United States Patent
Chang

(10) Patent No.: US 10,008,001 B2
(45) Date of Patent: Jun. 26, 2018

(54) METHOD AND APPARATUS FOR MEASURING DEPTH INFORMATION

(71) Applicant: Wistron Corporation, New Taipei (TW)

(72) Inventor: Yao-Tsung Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 66 days.

(21) Appl. No.: 15/231,796

(22) Filed: Aug. 9, 2016

(65) Prior Publication Data

US 2017/0337702 A1    Nov. 23, 2017

(30) Foreign Application Priority Data

May 19, 2016    (TW) .............................. 105115425 A

(51) Int. Cl.
| | | |
|---|---|---|
| G06K 9/00 | (2006.01) | |
| G06T 7/507 | (2017.01) | |
| G06T 7/20 | (2017.01) | |
| G06T 7/521 | (2017.01) | |
| G01B 11/25 | (2006.01) | |

(52) U.S. Cl.
CPC ............... *G06T 7/507* (2017.01); *G06T 7/20* (2013.01); *G06T 7/521* (2017.01); *G01B 11/25* (2013.01); *G06T 2207/10028* (2013.01)

(58) Field of Classification Search
CPC ........... G01S 17/89; G06T 2207/10028; G06T 5/002; G01B 11/22; H04N 13/0271

USPC ......................................................... 382/106
See application file for complete search history.

(56) References Cited

U.S. PATENT DOCUMENTS

2012/0236293 A1    9/2012    Huang et al.

FOREIGN PATENT DOCUMENTS

| TW | 201237360 | 9/2012 |
| TW | 201310277 | 3/2013 |

OTHER PUBLICATIONS

"Office Action of Taiwan Counterpart Application" with English translation thereof, dated Nov. 11, 2016, p. 1- 8.

*Primary Examiner* — Charlotte M Baker
(74) *Attorney, Agent, or Firm* — JCIPRNET

(57) ABSTRACT

A method and an apparatus for measuring depth information are provided. In the method, a structured light with a scan pattern is projected by a light projecting device to scan at least one object. Reflected light from the object is detected by a light sensing device, and depth information of each object is calculated according to a deformation of a reflective pattern of the reflected light. Then, images of the object are captured by an image capturing device and used to obtain location information of each object. At least one moving object is found among the objects according to a change of the location information. Finally, at least one of a scan area, a scan frequency, a scan resolution and the scan pattern of the structured light and an order for processing data obtained from scanning is adjusted so as to calculate the depth information of each object.

20 Claims, 7 Drawing Sheets

METHOD AND APPARATUS FOR MEASURING DEPTH INFORMATION

CROSS-REFERENCE TO RELATED APPLICATION

This application claims the priority benefit of Taiwan application serial no. 105115425, filed on May 19, 2016. The entirety of the above-mentioned patent application is hereby incorporated by reference herein and made a part of this specification.

BACKGROUND OF THE INVENTION

Field of the Invention

The invention relates to a measuring method and a measuring apparatus and more particularly relates to a depth information measuring method and a depth information measuring apparatus.

Description of Related Art

In recent years, 3D cameras have become fairly popular, among which a dual-lens camera can use the disparity of two lenses to measure the distance between the camera and each object in the captured image. The time of fly (TOP) technology is to dispose a light source on an image sensor, project a light by using the light source, and then sense a reflected light from the object by using the image sensor after the projected light reaches the object, so as to measure the distance to the object according to the time for the light to travel back and forth. Another technology is to dispose a light emitter and a light receiver at different locations and then use an emission angle of the light emitted by the light emitter, a reflection angle of the reflected light received by the light receiver, and the distance between the light emitter and the light receiver to calculate the distance to the object by triangulation.

While it is easy to measure the distance to one single object, it will take a lot of time and calculation to measure the distances to multiple objects in the entire area. Regarding this, structure lighting technology has been developed recently, which utilizes the principle that the change of the surface curvature of the object under measurement will cause the pattern projected thereon to deform, and projects a light having a specific pattern to the object to be measured at a known angle and detects the reflective pattern from the object, so as to calculate a depth of each object based on a degree of deformation of the specific pattern in the reflective pattern. Therefore, the distance to the object to be measured can be obtained quickly with less processing time and lower equipment costs.

Generally, the structure lighting technology scans the object by using a pattern of multiple parallel scan lines (e.g., vertical lines or horizontal lines) so as to reduce the calculation amount by simplifying the pattern. Even though the pattern is simplified, according to the current structure lighting technology, it is still required to scan the entire image, and if the pattern complexity is increased (for example, the scan frequency is increased) in order to improve the accuracy of determination, the calculation amount will increase significantly.

SUMMARY OF THE INVENTION

The invention provides a depth information measuring method and a depth information measuring apparatus capable of effectively reducing the computing resources and processing time required for measuring depth information.

The depth information measuring method of the invention is adapted for an electronic device that includes a light projecting device, a light sensing device, and an image capturing device. In the method, a structured light with a scan pattern is projected by a light projecting device to scan at least one object, and a reflected light from the at least one object is detected by a light sensing device, and depth information of each of the at least one object is calculated according to a deformation of a reflective pattern of the reflected light. Then, an image including the at least one object is captured by an image capturing device to obtain location information of each of the at least one object, and at least one moving object is found among the at least one object according to a change of the location information. Finally, at least one of a scan area, a scan frequency, a scan resolution, and the scan pattern of the structured light and an order of processing data obtained from scanning is adjusted according to an area where the at least one moving object is located, so as to calculate the depth information of each of the at least one object.

The depth information measuring apparatus of the invention includes a light projecting device, a light sensing device, and an image capturing device. The light projecting device projects a structured light with a scan pattern to scan at least one object. The light sensing device detects a reflected light from the at least one object. The image capturing device captures an image including the at least one object. A processor is coupled to the light projecting device, the light sensing device, and the image capturing device and controls the light projecting device to project the structured light, controls the light sensing device to detect the reflected light, and calculates depth information of each of the at least one object according to a deformation of a reflective pattern of the reflected light. The processor obtains location information of each of the at least one object from the image and finds a moving object among the at least one object according to a change of the location information. The processor further adjusts at least one of a scan area, a scan frequency, a scan resolution, and the scan pattern of the structured light projected by the light projecting device and an order of processing data obtained from scanning according to an area where the moving object is located.

Based on the above, the depth information measuring method and apparatus of the invention detect the moving object in the captured image and dynamically adjust the scan area, the scan frequency, the scan resolution, or the scan pattern of the structured light according to the area where the moving object is located or process calculation of the depth information of the area where the moving object is located with priority. Accordingly, the scan time is saved, the processing speed is increased, or the scan resolution is increased given the same processing time.

To make the aforementioned and other features and advantages of the invention more comprehensible, several embodiments accompanied with figures are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

The invention is directed to a structured light technology, which reduces a scan frequency of a structured light if an object in a captured image does not move, and dynamically adjusts a size of a scan area or a frequency according to an area where a moving object is located if the moving object is detected. In case that only a few objects in the image move, according to the invention, the scan frequency or scan resolution may be increased only for the areas where the moving objects are located while the scan frequency or scan resolution is reduced for other areas, or the scanning for other areas may be stopped. Accordingly, the scan time is saved, the processing speed is increased, or the scan resolution is increased given the same processing time.

Figure 1:
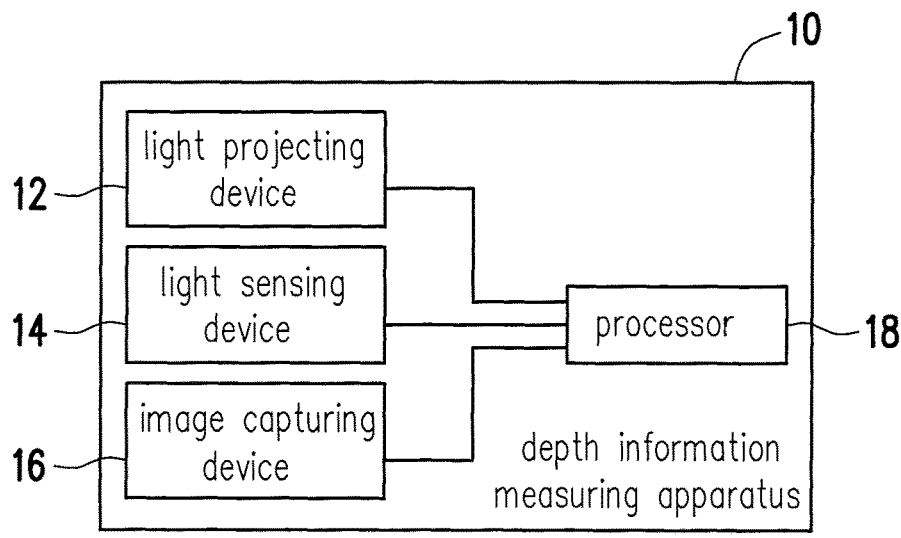
FIG. 1 is a block diagram showing the depth information measuring apparatus according to an embodiment of the invention.

FIG. 1 is a block diagram showing a depth information measuring apparatus according to an embodiment of the invention. Referring to FIG. 1, a depth information measuring apparatus 10 of this embodiment is, for example, an electronic device that is capable of executing a depth measuring function independently or may be integrated with a device having an image capturing function, such as a digital camera, a mobile phone, a tablet computer, or a laptop computer, to provide depth information required for capturing images. The depth information measuring apparatus 10 includes a light projecting device 12, a light sensing device 14, an image capturing device 16, and a processor 18 respectively having functions described below:

The light projecting device 12 is a light emitting device capable of projecting an invisible light, such as an infrared ray. In order to improve accuracy, the light projecting device 12 primarily uses a laser light, especially an infrared laser light. The light projecting device 12 is, for example, controlled by the processor 18 to project a structured light with a specific scan pattern (e.g., horizontal lines or vertical lines) and adjust the scan pattern, a scan frequency, a scan resolution, or a size of a scan area of the projected structured light.

The light sensing device 14 is, for example, a special light camera, such as an infrared camera, that is used with the light projecting device 12 and capable of detecting a reflected light from an object when the structured light projected by the light projecting device 12 reaches the object. The light sensing device 14 is also controlled by the processor 18 to adjust a size of an area for receiving the structured light.

The image capturing device 16 is, for example, a camera or a video camera, which includes an optical prime lens or an optical zoom lens and a photosensitive element, such as a charge coupled device (CCD) or a complementary metal-oxide semiconductor (CMOS), and captures an image of the object, from which the depth information measuring apparatus 10 measures depth.

The processor 18 is coupled to the light projecting device 12, the light sensing device 14, and the image capturing device 16, and may be a central processing unit (CPU), a programmable microprocessor for general use or special use, a digital signal processor (DSP), a programmable controller, an application specific integrated circuit (ASIC), other similar devices, or a combination of the foregoing, for example. In this embodiment, the processor 18 controls the light projecting device 12, the light sensing device 14, and the image capturing device 16 to execute a depth information measuring method according to an embodiment of the invention.

It is noted that, in an embodiment, the light projecting device 12, the light sensing device 14, and the image capturing device 16 may be further connected with a lens controller (not shown), which receives a control command of the processor 18 to control the light projecting device 12 to project the structured light with the desired pattern, control the light sensing device 14 to detect the reflected light, and control the image capturing device 16 to capture the image, and transmit information of the reflected light detected by the light sensing device 14 and information of the image captured by the image capturing device 16 to the processor 18. For example, the lens controller may control the light projecting device 12 to adjust the size of the scan area, the scan frequency, and the scan pattern of the projected structured light, and may also control the light sensing device 14 to adjust the size of the area for detecting the reflected light, and may further control the image capturing device 16 to adjust a focal length for capturing the image. In addition, the depth information measuring apparatus 10, for example, further includes a storage device (not shown), such as a memory or a memory card, for storing a program to be executed by the processor 18, an input device (not shown), such as a touch screen, a touch pad, or a keyboard, for receiving an operation of the user, and a display device (not shown) for displaying a view of the image capturing device 16, the captured image, relevant information, and a user operation interface.

Figure 2:
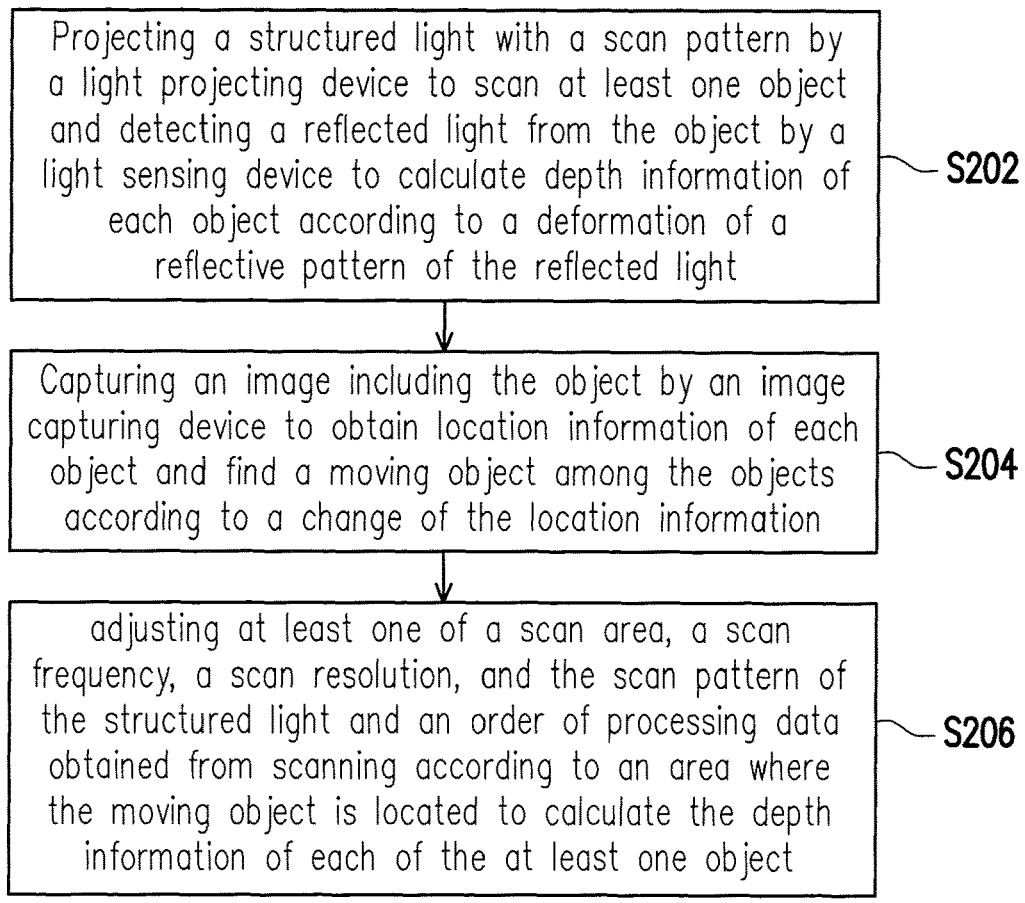
FIG. 2 is a flowchart showing the depth information measuring method according to an embodiment of the invention.

FIG. 2 is a flowchart showing a depth information measuring method according to an embodiment of the invention. Referring to FIG. 1 and FIG. 2, the depth information measuring method of this embodiment is adapted for the depth information measuring apparatus 10 of FIG. 1 described above. Detailed steps of the depth information measuring method of this embodiment are described hereinafter with reference to the devices of the depth information measuring apparatus 10 of FIG. 1.

First, the processor 18 controls the light projecting device 12 to project a structured light with a scan pattern to scan at least one object and controls the light sensing device 14 to detect a reflected light of the object, so as to calculate depth information of each object according to a deformation of a reflective pattern of the reflected light (Step S202). For example, the processor 18 controls the light projecting device 12 to project the structured light according to a predetermined scan pattern first. The scan pattern includes a plurality of parallel horizontal lines or vertical lines, and an interval and a width of the horizontal lines or the vertical lines are determined by the processor 18 according to a predetermined scan resolution, for example. Moreover, according to a principle of the structured light technology, the processor 18 analyzes the deformation of the reflective pattern with respect to the scan pattern to find a corresponding relationship between a pixel in the reflective pattern and a pixel in the scan pattern, and then calculates the depth information of the object with respect to the depth information measuring apparatus 10 by triangulation based on a projecting angle by which the light projecting device 12 projects the structured light to a specific position on the object, a sensing angle by which the light sensing device 14 receives the reflected light from the specific position on the object, and a distance between the light projecting device 12 and the light sensing device 14.

Next, the processor 18 controls the image capturing device 16 to capture an image including the object to obtain location information of each object and find at least one moving object among the objects according to a change of the location information (Step S204). For example, the processor 18 compares a current image captured by the image capturing device 16 with a previous image to find objects having corresponding features in the two images according to features of the objects in the images, and then finds the moving object in the current image according to a location change of the corresponding object.

It is noted that, by the aforementioned image capturing method, the processor 18 finds objects that move in a two-dimensional direction. In another embodiment, the processor 18 may further combine the location information of each object and the depth information of the object calculated in Step S202 into three-dimensional information and find the moving object according to a change of the three-dimensional information. Accordingly, the processor 18 not only finds objects that move in the two-dimensional direction but also finds objects that move in a depth direction.

After the moving objects are found, the processor 18 adjusts at least one of the scan area, the scan frequency, the scan resolution, and the scan pattern of the structured light projected by the light projecting device 12 and an order of processing the data obtained from the scanning according to the area where the moving objects are located (Step S206). Specifically, the structured light originally projected by the light projecting device 12 is for the entire area. Therefore, the processor 18 calculates the depth information for the entire image. Usually, only a few areas in the image may change while the other areas remain unchanged. In such a case, it is not required to spend time processing data of the unchanged areas.

Accordingly, the processor 18 of this embodiment detects the moving object in the scan area so as to dynamically adjust the scan area, the scan frequency, the scan resolution, or the scan pattern of the structured light projected by the light projecting device 12 according to the size of the area where the moving object is located, adjust the area detected by the light sensing device 14 and the frequency, adjust the area and size of the image captured by the image capturing device 16, or adjust the order that the processor 18 processes the data to process the data of the area where the moving object is located with priority so as to calculate the depth information thereof. The method described above achieves effects of saving the scan time and increasing the processing speed. Several embodiments thereof are described in detail hereinafter.

Figure 3A:
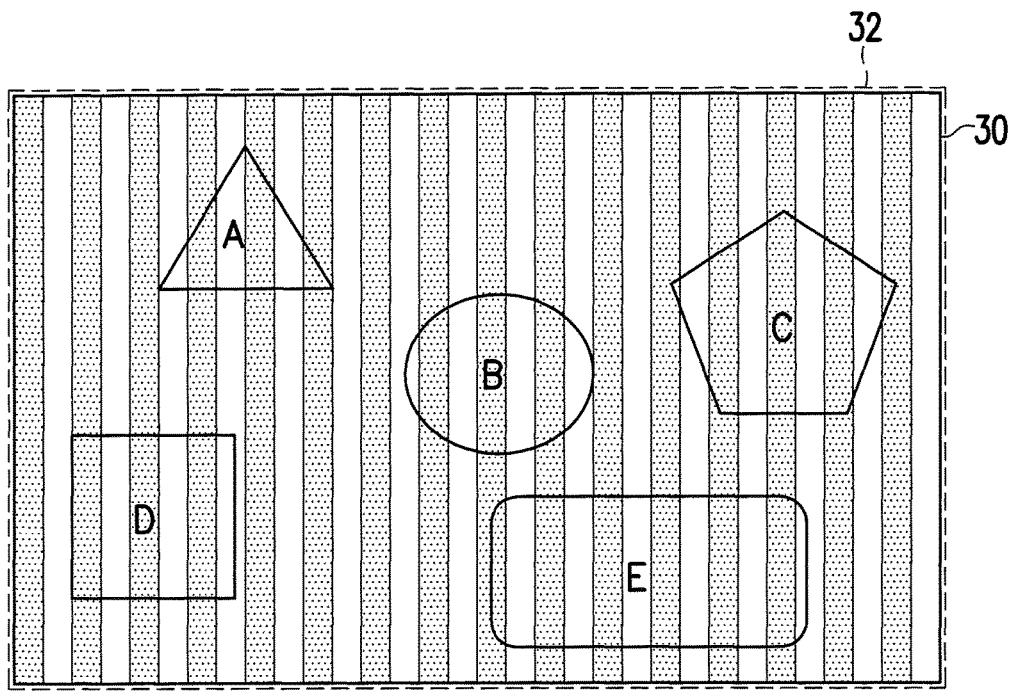
FIG. 3A to FIG. 3J are examples of the depth information measuring method according to an embodiment of the invention.

FIG. 3A to FIG. 3J are examples of the depth information measuring method according to an embodiment of the invention. An image 30 shown in FIG. 3A is an image that the depth information measuring apparatus of the invention controls the image capturing device to capture, which includes objects A-E, wherein a scan pattern 32 is a pattern of the structured light that the depth information measuring apparatus projects by using the light projecting device, and includes a plurality of parallel vertical lines.

First Embodiment

Figure 3B:
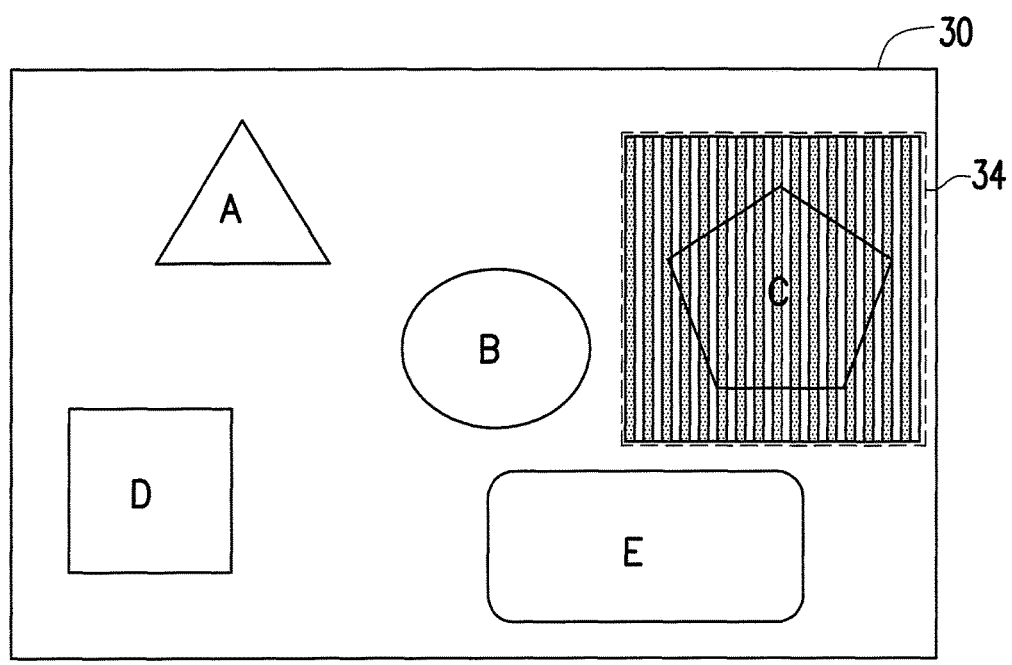

Referring to FIG. 3A and FIG. 3B, when the depth information measuring apparatus compares the two-dimensional or three-dimensional information of each object in the image 30 of FIG. 3A and detects movement of an object C in the image 30, the depth information measuring apparatus controls the light projecting device to increase the scan resolution of the projected structured light only for an area 34 where the object C is located according to the location and size of the area 34 where the object C is located (as shown in FIG. 3B) and stops projecting the structured light to other areas. Accordingly, the accuracy of the depth information of the area 34 measured by the depth information measuring apparatus is improved, and the time and computing resources required for processing the depth information of the other areas are saved.

It should be noted that, in another embodiment, when the depth information measuring apparatus detects movement of the object C in the image 30, the depth information measuring apparatus may control the light projecting device to increase the scan frequency of the projected structured light only for the area 34 where the object C is located according to the location and size of the area 34 where the object C is located (as shown in FIG. 3B), and stop projecting the structured light to the other areas. Accordingly, the sensitivity (i.e., temporal change) of the depth information measuring apparatus that measures the depth information of the area 34 is improved.

Second Embodiment

Figure 3C:
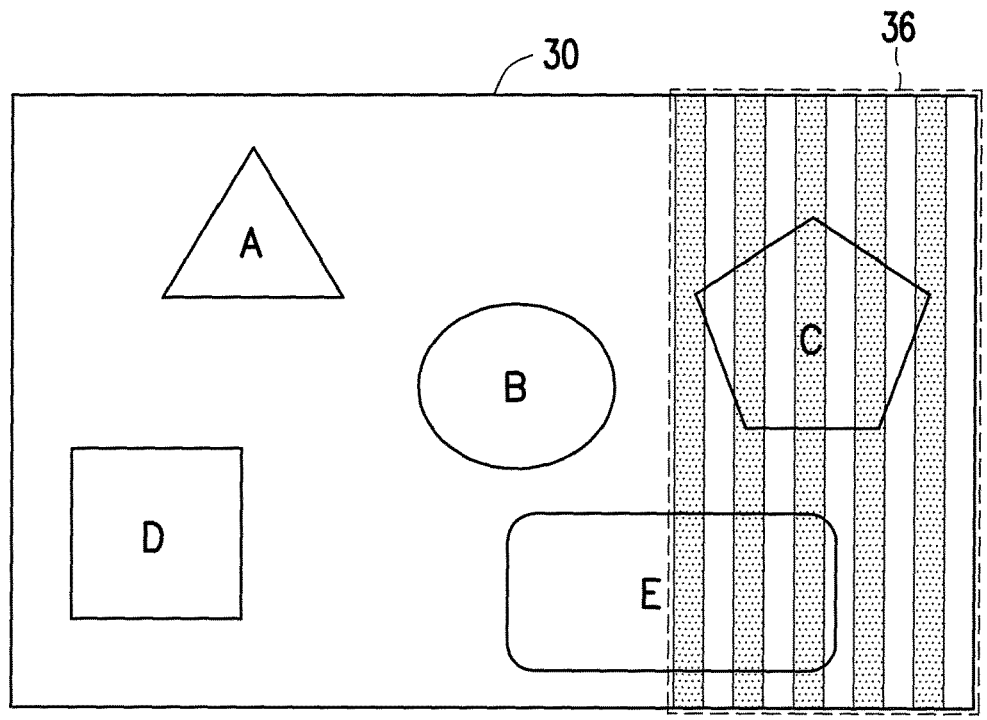

Referring to FIG. 3A and FIG. 3C, when the depth information measuring apparatus compares the two-dimensional or three-dimensional information of each object in the image 30 of FIG. 3A and detects movement of the object C in the image 30, the depth information measuring apparatus controls the light projecting device to project the structured light only to an area 36 where the object C is located and maintains the scan resolution of the projected structured light according to the location and size of the area 36 where the object C is located (as shown in FIG. 3C), and at the same time stops projecting the structured light to other areas. Accordingly, the scan time is saved and the processing speed is increased.

Third Embodiment

Figure 3D:
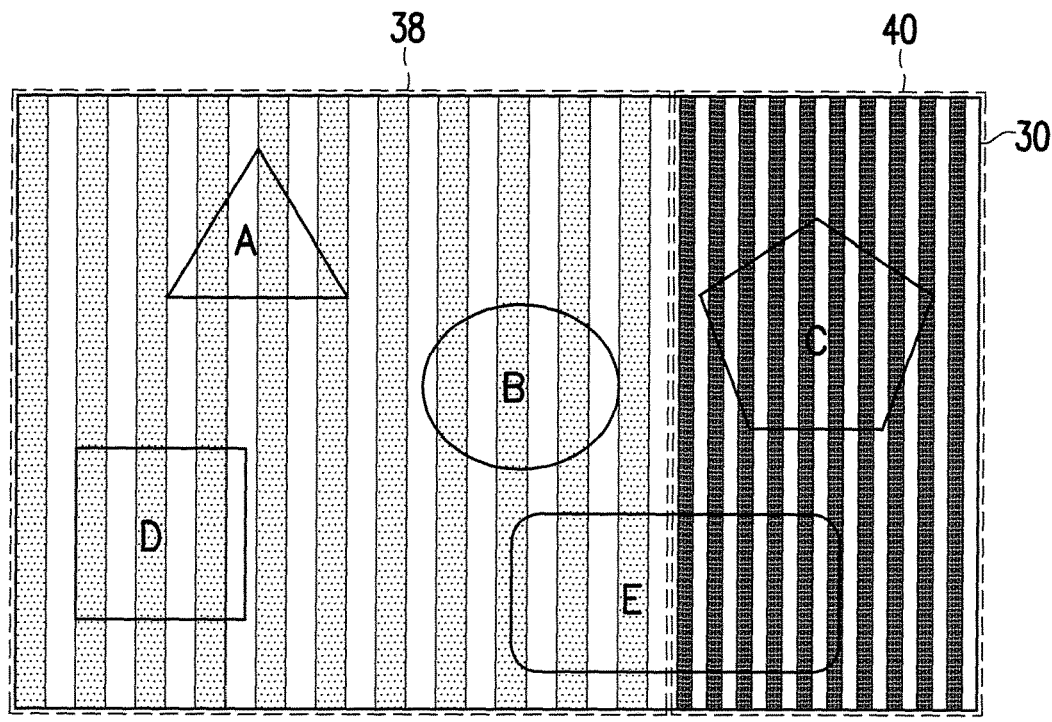

Referring to FIG. 3A and FIG. 3D, when the depth information measuring apparatus compares the two-dimensional or three-dimensional information of each object in the image 30 of FIG. 3A and detects movement of the object C in the image 30, the depth information measuring apparatus controls the light projecting device to increase the scan resolution of the projected structured light for an area 40 where the object C is located according to the location and size of the area 40 where the object C is located (as shown in FIG. 3D), and maintain the scan resolution of the projected structured light for other areas 38. Accordingly, the accuracy of measuring the depth information of the area 40 is increased while detection of a depth change of the other areas 38 continues.

It is worth mentioning that, regarding the embodiment of increasing the scan resolution for the area 40 where the object C is located, in another embodiment, the depth information measuring apparatus may, after scanning the entire image 30, control the light projecting device to execute an additional scan on the area where the moving object is located and control the light projecting device to increase the scan resolution of the structured light projected to the area where the moving object is located in this scan.

For example, after controlling the light projecting device to perform an Nth scan on the entire image 30, the depth information measuring apparatus may control the light projecting device to perform an additional N+1 th scan on the area 40 where the object C is located, wherein the scan lines of the N+1 th scan is twice as many as the scan lines of the Nth scan, so as to increase the accuracy when the depth information measuring apparatus measures the depth information of the area 40.

It should be noted that, in another embodiment, when the depth information measuring apparatus detects movement of the object C in the image 30, the depth information measuring apparatus may control the light projecting device to increase the scan frequency of the projected structured light for the area 40 where the object C is located according to the location and size of the area 40 where the object C is located (as shown in FIG. 3D), and maintain the scan frequency of the projected structured light for other areas 38. Accordingly, the sensitivity of measuring the depth information of the area 40 is increased.

Fourth Embodiment

Figure 3E:
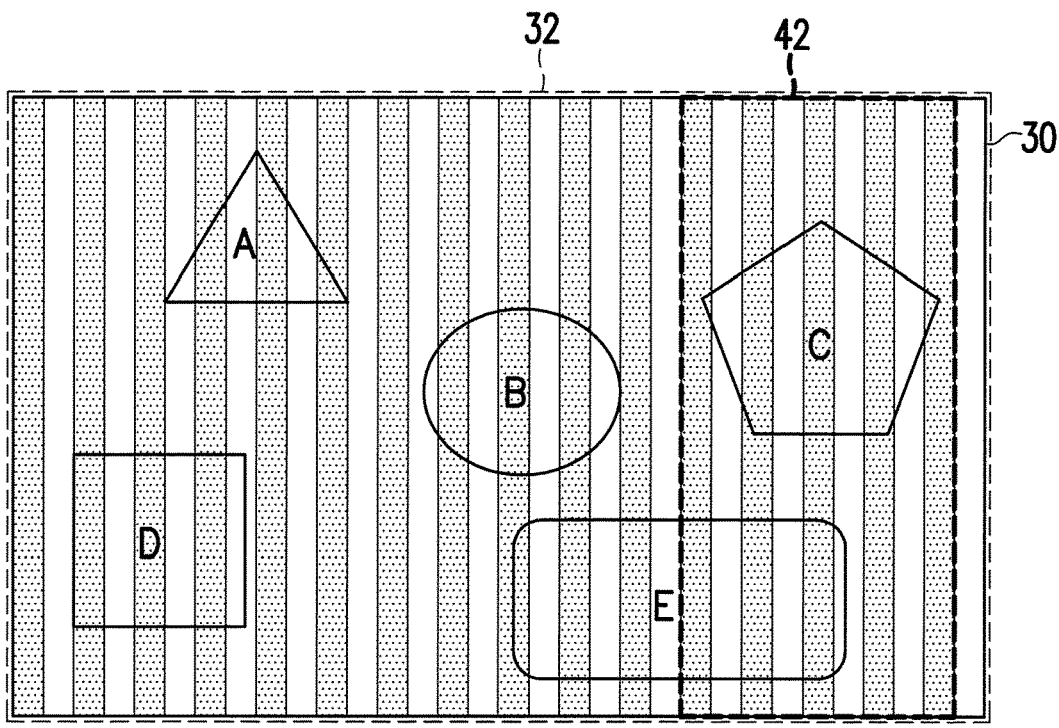
Figure 3F:
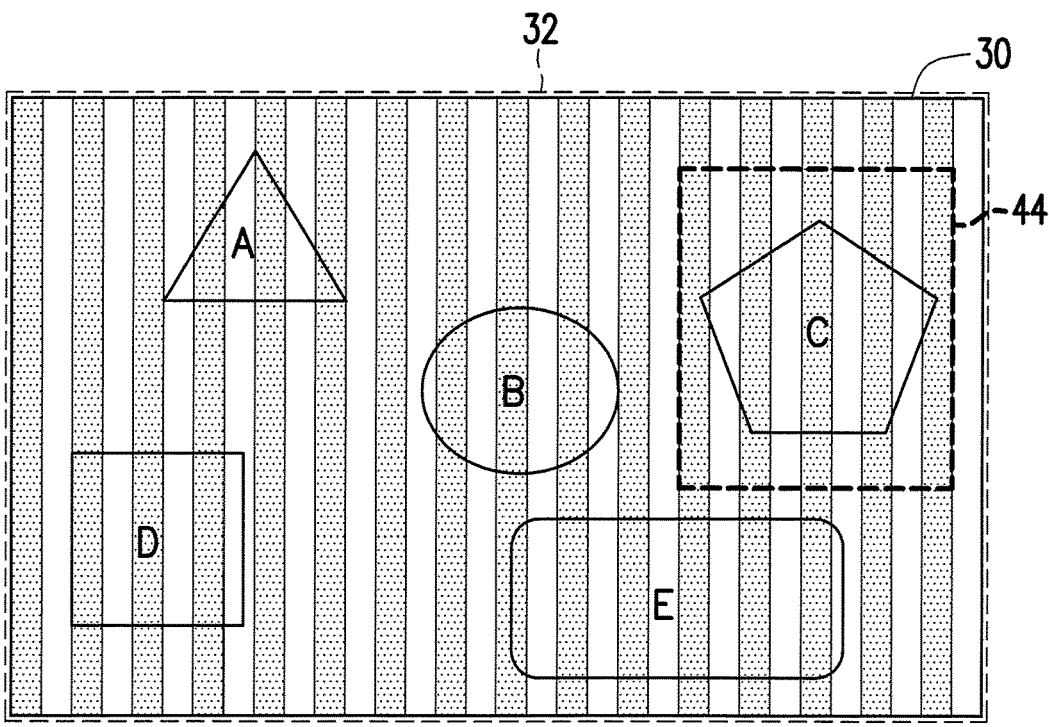

Referring to FIG. 3A, FIG. 3E, and FIG. 3F, when the depth information measuring apparatus compares the two-dimensional or three-dimensional information of each object in the image 30 of FIG. 3A and detects movement of the object C in the image 30, the depth information measuring apparatus controls the light projecting device to maintain the original scan resolution of the projected scan pattern 32, but processes data only for the area where the object C is located in the reflective pattern or processes the data of the area where the object C is located with priority, so as to calculate the depth information of the moving object C. The area where the object C is object C in the image 30 (as shown in FIG. 3E), or an area 44 formed by pixels in a certain range around the object C (as shown in FIG. 3F). By the processing method described above, the depth information measuring apparatus is able to acquire dynamic movement of the moving object quickly with limited time or computing resources.

It should be noted that, in another embodiment, when the depth information measuring apparatus detects movement of the object C in the image 30, the depth information measuring apparatus may control the light projecting device to maintain the original scan frequency of the projected scan pattern 32, and process data only for the area where the object C is located (e.g., the area 42 of FIG. 3E or the area 44 of FIG. 3F) in the reflective pattern or process the data of the area where the object C is located with priority, so as to calculate the depth information of the moving object C. Accordingly, the scan time is saved and the processing speed is increased.

Fifth Embodiment

Figure 3G:
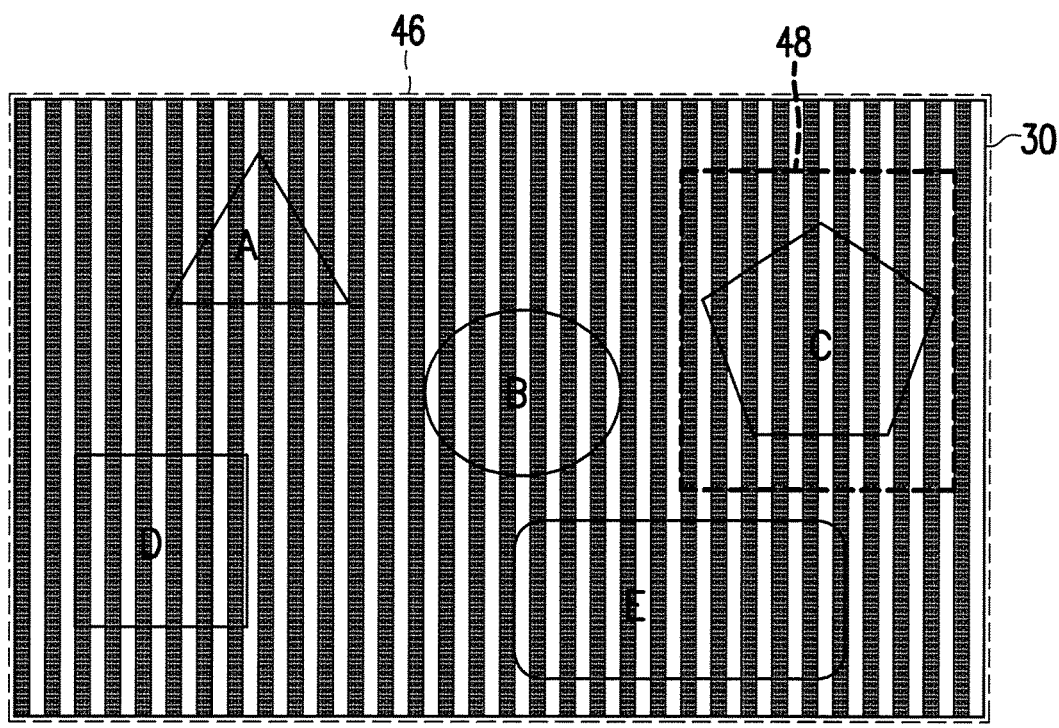
Figure 3H:
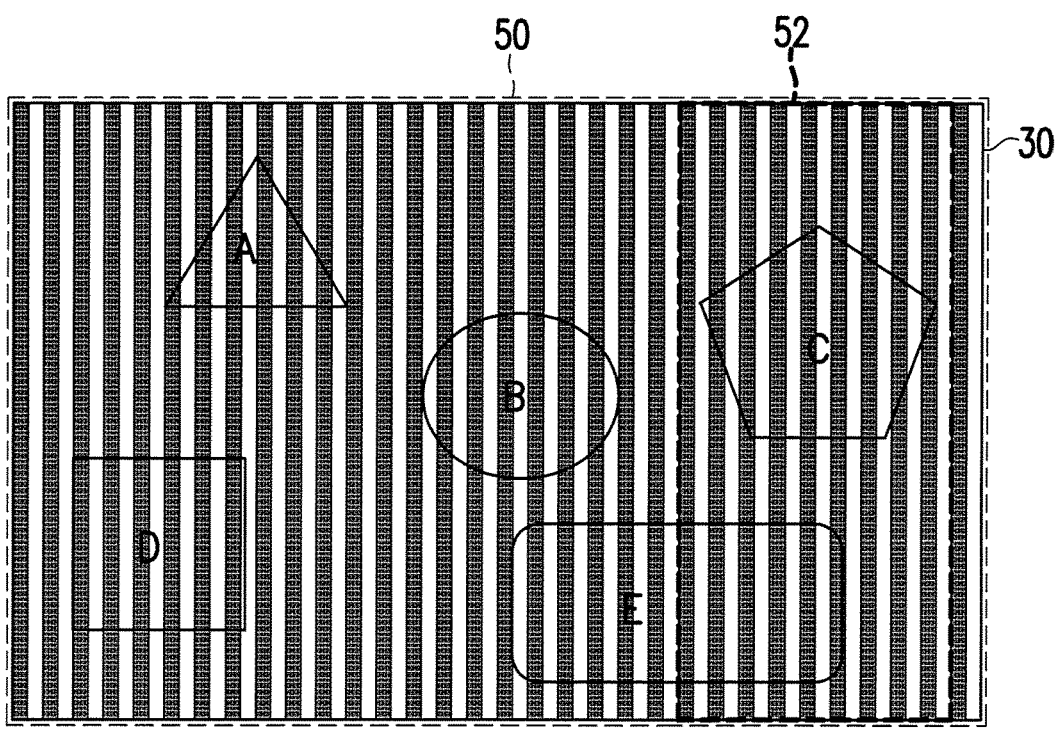

Referring to FIG. 3A, FIG. 3G, and FIG. 3H, when the depth information measuring apparatus compares the two-dimensional or three-dimensional information of each object in the image 30 of FIG. 3A and detects movement of the object C in the image 30, the depth information measuring apparatus controls the light projecting device to increase the scan resolution of the projected scan pattern according to the location and size of the moving object C, and processes data only for the area where the object C is located in the detected reflective pattern or processes the data of the area where the object C is located with priority, so as to calculate the depth information of the moving object C. For example, the depth information measuring apparatus controls the light projecting device to increase the scan resolution of the projected scan pattern (e.g., the scan pattern 46 of FIG. 3G) and processes data of an area 48 (the area formed by pixels in a certain range around the object C in the image 30) where the object C is located in the reflective pattern with priority, so as to calculate the depth information of the moving object C. Alternatively, the depth information measuring apparatus controls the light projecting device to increase the scan resolution of the projected scan pattern (e.g., the scan pattern 50 of FIG. 3H) and processes data of an area 52 (the area formed by all pixels in the columns covered by the object C in the image 30) where the object C is located in the reflective pattern with priority, so as to calculate the depth information of the moving object C. By the processing method described above, the depth information measuring apparatus is able to acquire dynamic movement of the moving object quickly with limited time or computing resources, increase the scan resolution, and improve the accuracy of the measured depth information.

It should be noted that, in another embodiment, when the depth information measuring apparatus detects movement of the object C in the image 30, the depth information measuring apparatus may control the light projecting device to increase the scan resolution of the projected scan pattern only, so as to improve the accuracy of the measured depth information. When the depth information measuring apparatus detects that the object C stops moving, the depth information measuring apparatus then controls the light projecting device to restore the original scan resolution of the projected scan pattern. Since the scan resolution is increased only when the moving object is detected, the accuracy of measuring the depth information of the moving object is improved and the scan time is saved as well.

In yet another embodiment, when the depth information measuring apparatus detects movement of the object C in the image 30, the depth information measuring apparatus may control the light projecting device to increase the scan frequency of the projected scan pattern only, so as to improve the sensitivity of the measured depth information. When the depth information measuring apparatus detects that the object C stops moving, the depth information measuring apparatus then controls the light projecting device to restore the original scan frequency of the projected scan pattern. Since the scan frequency is increased only when the moving object is detected, the sensitivity of measuring the depth information of the moving object is improved and the scan time is saved as well.

Sixth Embodiment

Figure 3I:
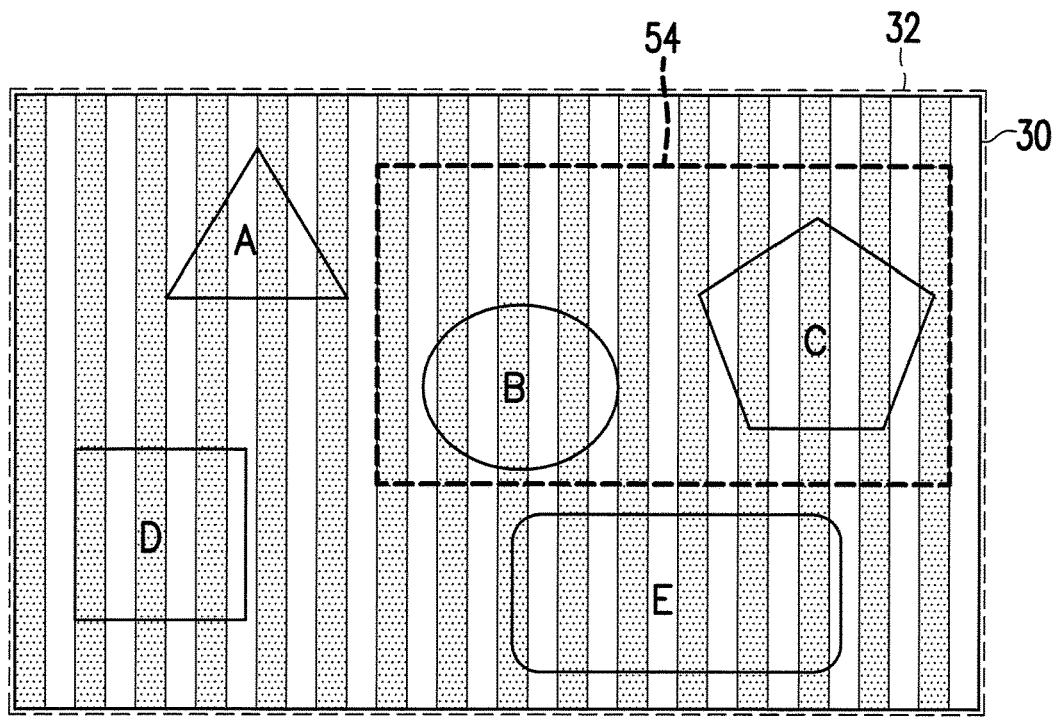
Figure 3J:
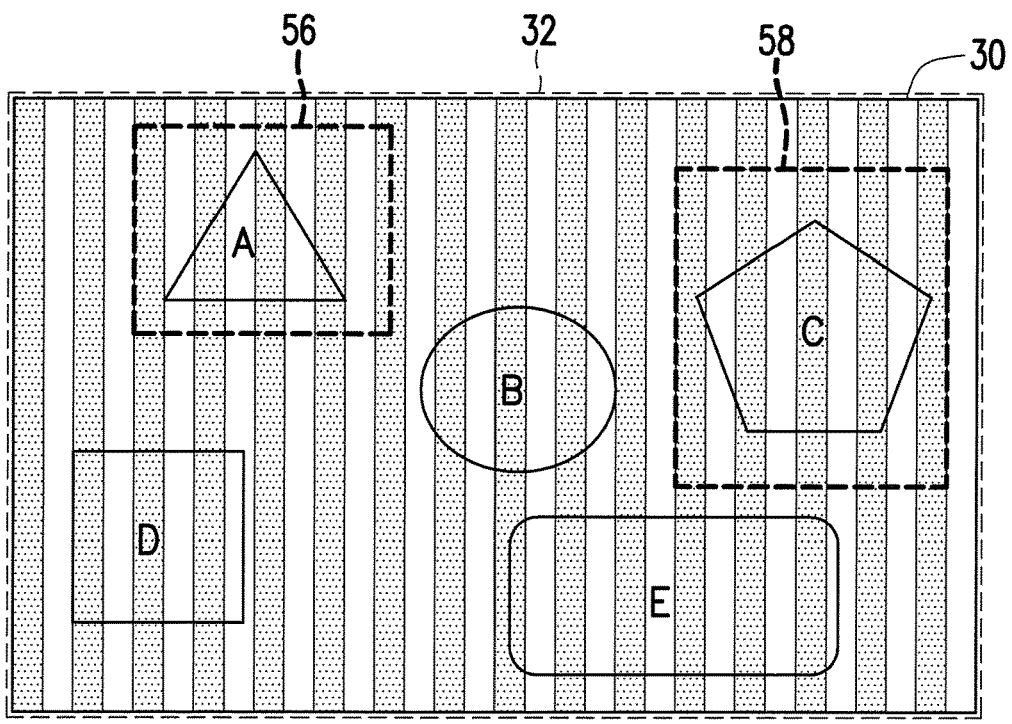

Referring to FIG. 3A and FIG. 3I, when the depth information measuring apparatus compares the two-dimensional or three-dimensional information of each object in the image 30 of FIG. 3A and detects movement of objects B and C in the image 30, the depth information measuring apparatus determines that the areas where the objects B and C are located are adjacent to each other according to the locations and sizes (e.g., a distance between the moving objects B and C) of the moving objects B and C. Accordingly, the depth information measuring apparatus combines the areas where the moving objects B and C are located into an area 54 and adjusts the scan area of the structured light projected by the light projecting device to the area 54, so as to obtain the depth information of the moving objects B and C. On the other hand, referring to FIG. 3A and FIG. 3J, when the depth information measuring apparatus compares the two-dimensional or three-dimensional information of each object in the image 30 of FIG. 3A and detects movement of objects A and C in the image 30, the depth information measuring apparatus determines that the areas 56 and 58 where the objects A and C are located are not adjacent to each other according to the locations and sizes (e.g., a distance between the moving objects A and C) of the moving objects A and C. Accordingly, the depth information measuring apparatus controls the light projecting device to respectively project the structured light to the areas 56 and 58 and respectively processes data of the areas 56 and 58, so as to obtain the depth information of the moving objects A and C.

It should be noted that the measuring methods described in the above embodiments are applied to cases where moving objects are detected. In another embodiment, after the depth information measuring apparatus detects the moving objects and adjusts the structured light accordingly, the depth information measuring apparatus continues detecting movement of the moving objects, and ends adjustment of the structured light if a time of not detecting movement of the moving objects exceeds a predetermined time.

Figure 4:
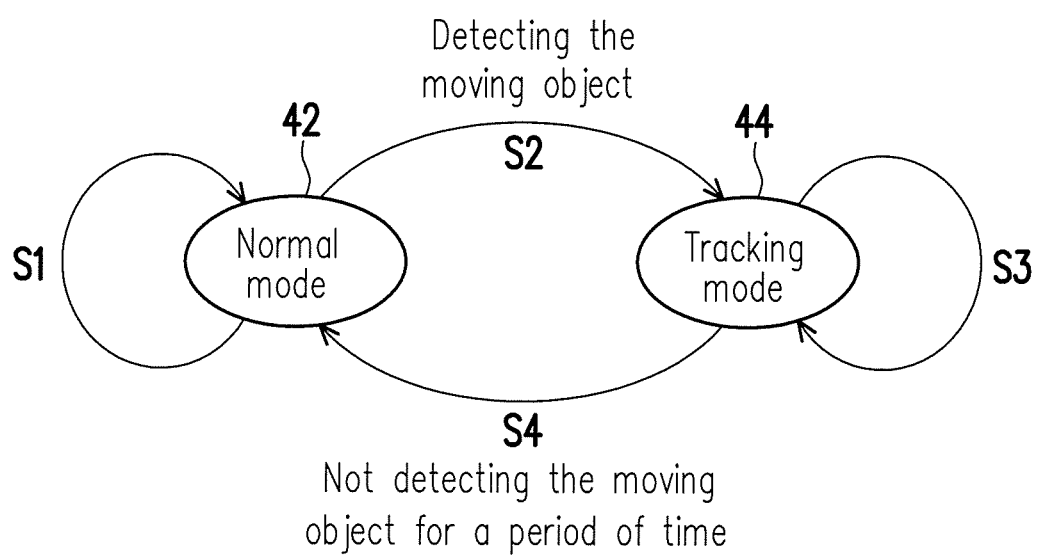
FIG. 4 is a state machine of the depth information measuring apparatus according to an embodiment of the invention.

For example, FIG. 4 is a state machine of the depth information measuring apparatus according to an embodiment of the invention. Referring to FIG. 4, a state machine 40 has a normal mode 42 and a tracking mode 44. In a state S1, the depth information measuring apparatus detects no movement and therefore remains in the normal mode 42. In this case, in order to save power, the depth information measuring apparatus reduces the scan frequency or resolution as appropriate, for example. In a state S2, the depth information measuring apparatus detects the moving object and enters the tracking mode 44 to increase the scan frequency or resolution for the area where the moving object is located and stop detecting other areas or reduce the scan frequency or resolution for the other areas. In a state S3, the depth information measuring apparatus continues detecting the moving object and therefore continues increasing the scan frequency or resolution for the area where the moving object is located. In a state S4, the depth information measuring apparatus does not detect any moving object for a period of time and returns to the normal mode 42 and ends adjustment of the scan area, the scan frequency, the scan resolution, or the scan pattern of the structured light and/or the order of processing the data obtained from the scanning, so as to achieve power saving.

To sum up, the depth information measuring method and apparatus of the invention detect the moving object by capturing the image of the objects and, according to the location and size of the area where the moving object is located, dynamically adjust the scan area, the scan frequency, the scan resolution, or the scan pattern of the structured light projected by the light projecting device, and/or the order of processing the data obtained from the scanning. Accordingly, the scan time is saved, the processing speed is increased, or the scan resolution is increased given the same processing time.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A depth information measuring method for an electronic device that comprises a light projecting device, a light sensing device, and an image capturing device, the depth information measuring method comprising:
    projecting a structured light with a scan pattern by the light projecting device to scan at least one object and detecting a reflected light from the at least one object by the light sensing device to calculate depth information of each of the at least one object according to a deformation of a reflective pattern of the reflected light;
    capturing an image comprising the at least one object by the image capturing device to obtain location information of each of the at least one object and find at least one moving object among the at least one object according to a change of the location information; and
    adjusting at least one of a scan area, a scan frequency, a scan resolution, and the scan pattern of the structured light and an order of processing data obtained from scanning according to at least one area where the at least one moving object is located to provide the depth information of each of the at least one object, where the depth information is calculated using said adjusting only for the at least one area comprising the at least one moving object.

2. The depth information measuring method according to claim 1, wherein the step of finding the at least one moving object among the at least one object according to the change of the location information further comprises:
    combining the location information and the depth information of each of the at least one object into three-dimensional information; and
    finding the at least one moving object according to a change of the three-dimensional information.

3. The depth information measuring method according to claim 1, wherein the step of adjusting at least one of the scan area, the scan frequency, the scan resolution, and the scan pattern of the structured light and the order of processing the data obtained from the scanning comprises:
    controlling the light projecting device to increase the scan frequency or the scan resolution of the structured light projected to the at least one area where the at least one moving object is located.

4. The depth information measuring method according to claim 3, wherein the step of adjusting at least one of the scan area, the scan frequency, the scan resolution, and the scan pattern of the structured light and the order of processing the data obtained from the scanning comprises:
    controlling the light projecting device to stop projecting the structured light to an area other than the at least one area where the at least one moving object is located.

5. The depth information measuring method according to claim 3, wherein the step of controlling the light projecting device to increase the scan frequency of the structured light projected to the at least one area where the at least one moving object is located comprises:
    executing an additional scan on the at least one area where the at least one moving object is located and controlling the light projecting device to increase the scan resolution of the structured light projected to the at least one area where the at least one moving object is located in the additional scan.

6. The depth information measuring method according to claim 1, wherein the step of adjusting at least one of the scan area, the scan frequency, the scan resolution, and the scan pattern of the structured light and the order of processing the data obtained from the scanning comprises:
    controlling the light projecting device to project the structured light only to the at least one area where the at least one moving object is located and maintain the scan frequency of the projected structured light.

7. The depth information measuring method according to claim 1, wherein the step of adjusting at least one of the scan area, the scan frequency, the scan resolution, and the scan pattern of the structured light and the order of processing the data obtained from the scanning to provide the depth information of each of the at least one object, where the depth information is calculated using said adjusting only for the at least one area comprising the at least one moving object comprises:
processing data of the at least one area where the at least one moving object is located in the reflective pattern with priority to calculate the depth information of the at least one moving object.

8. The depth information measuring method according to claim 1, wherein the step of adjusting at least one of the scan area, the scan frequency, the scan resolution, and the scan pattern of the structured light and the order of processing the data obtained from the scanning to provide the depth information of each of the at least one object, where the depth information is calculated using said adjusting only for the at least one area comprising the at least one moving object comprises:
controlling the light projecting device to increase the scan resolution of the projected structured light according to a location and a size of the at least one moving object; and
processing the data of the at least one area where the at least one moving object is located in the reflective pattern with priority to calculate the depth information of the at least one moving object.

9. The depth information measuring method according to claim 1, wherein the step of adjusting at least one of the scan area, the scan frequency, the scan resolution, and the scan pattern of the structured light and the order of processing the data obtained from the scanning comprises:
combining adjacent areas where the at least one moving object is located to adjust at least one of the scan area, the scan frequency, the scan resolution, and the scan pattern of the structured light and the order of processing the data obtained from the scanning.

10. The depth information measuring method according to claim 1, wherein after the step of adjusting at least one of the scan area, the scan frequency, the scan resolution, and the scan pattern of the structured light and the order of processing the data obtained from the scanning, the depth information measuring method further comprises:
continuing detecting the at least one moving object, and if a time of not detecting the at least one moving object exceeds a predetermined time, ending adjusting at least one of the scan area, the scan frequency, the scan resolution, and the scan pattern of the structured light and the order of processing the data obtained from the scanning.

11. A depth information measuring apparatus, comprising:
a light projecting device projecting a structured light with a scan pattern to scan at least one object;
a light sensing device detecting a reflected light from the at least one object;
an image capturing device capturing an image comprising the at least one object; and
a processor coupled to the light projecting device, the light sensing device, and the image capturing device and controlling the light projecting device to project the structured light, controlling the light sensing device to detect the reflected light, and calculating depth information of each of the at least one object according to a deformation of a reflective pattern of the reflected light, wherein
the processor obtains location information of each of the at least one object by the image and finds at least one moving object among the at least one object according to a change of the location information; and
the processor adjusts at least one of a scan area, a scan frequency, a scan resolution, and the scan pattern of the structured light projected by the light projecting device and an order of processing data obtained from scanning according to at least one area where the at least one moving object is located to provide the depth information of each of the at least one object, where the depth information is calculated using said adjusting only for the at least one area comprising the at least one moving object.

12. The depth information measuring apparatus according to claim 11, wherein the processor further combines the location information and the depth information of each of the at least one object into three-dimensional information and finds the at least one moving object according to a change of the three-dimensional information.

13. The depth information measuring apparatus according to claim 11, wherein the processor further controls the light projecting device to increase the scan frequency or the scan resolution of the structured light projected to the at least one area where the at least one moving object is located.

14. The depth information measuring apparatus according to claim 13, wherein the processor further controls the light projecting device to stop projecting the structured light to an area other than the at least one area where the at least one moving object is located.

15. The depth information measuring apparatus according to claim 13, wherein the processor further controls the light projecting device to execute an additional scan on the at least one area where the at least one moving object is located and controls the light projecting device to increase the scan resolution of the structured light projected to the at least one area where the at least one moving object is located in the additional scan.

16. The depth information measuring apparatus according to claim 11, wherein the processor further controls the light projecting device to project the structured light only to the at least one area where the at least one moving object is located and maintain the scan frequency of the projected structured light.

17. The depth information measuring apparatus according to claim 11, wherein the processor further processes data of the at least one area where the at least one moving object is located in the reflective pattern to calculate the depth information of the at least one moving object.

18. The depth information measuring apparatus according to claim 11, wherein the processor further controls the light projecting device to increase the scan resolution of the projected structured light according to a location and a size of the at least one moving object, and process the data of the at least one area where the at least one moving object is located in the reflective pattern with priority to calculate the depth information of the at least one moving object.

19. The depth information measuring apparatus according to claim 11, wherein the processor further combines adjacent areas where the at least one moving object is located to adjust at least one of the scan area, the scan frequency, the scan resolution, and the scan pattern of the structured light projected by the light projecting device and the order of processing the data obtained from the scanning.

20. The depth information measuring apparatus according to claim 11, wherein the processor further continues detecting the at least one moving object, and if a time of not detecting the at least one moving object exceeds a predetermined time, ends adjusting at least one of the scan area, the scan frequency, the scan resolution, and the scan pattern of the structured light and the order of processing the data obtained from the scanning.

\* \* \* \* \*